Jan. 2, 1968     C. GUDMUNDSON     3,360,809
BOAT TRAILER
Filed Jan. 6, 1966
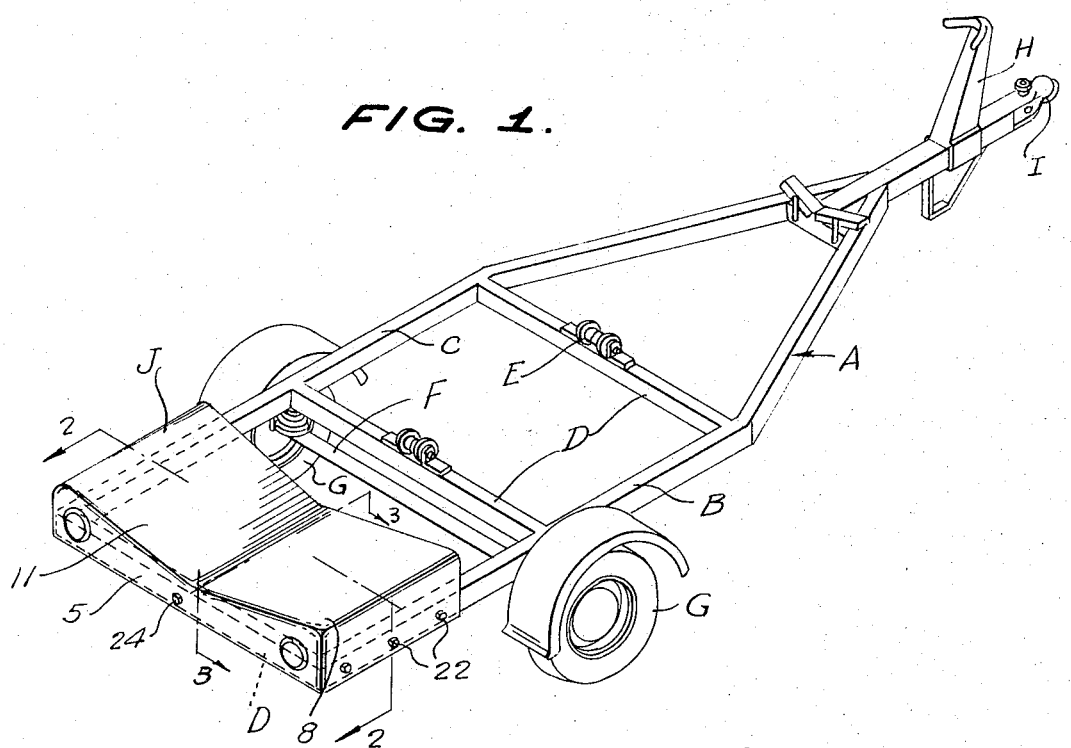
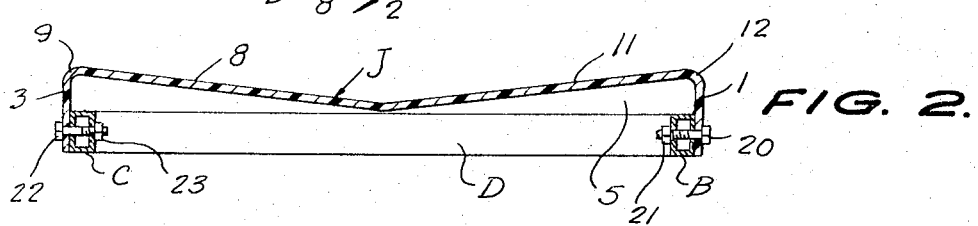
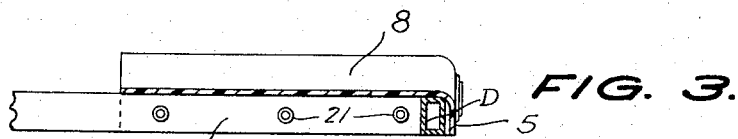
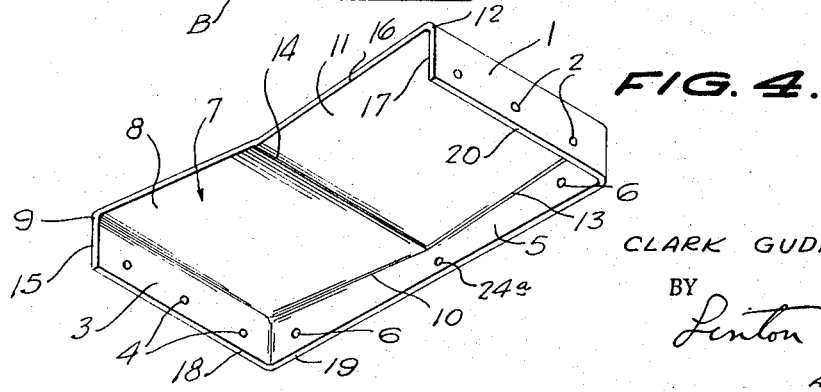
INVENTOR.
CLARK GUDMUNDSON,
BY
*Linton and Linton*
ATTORNEYS.

United States Patent Office 3,360,809
Patented Jan. 2, 1968

3,360,809
BOAT TRAILER
Clark Gudmundson, 267 East 550 North,
Bountiful, Utah 84010
Filed Jan. 6, 1966, Ser. No. 519,063
7 Claims. (Cl. 9—1)

ABSTRACT OF THE DISCLOSURE

The present boat trailer includes a wheeled frame having a shoe extending across and fastened to the rear end portion of the trailer onto which a boat is initially introduced when being mounted on the trailer and such shoe can be attached to conventional trailers or new trailers as desired.

Description

The principal object of the present invention is to provide a boat trailer having a metal frame and a shoe for the rear or boat entering and leaving portion of the trailer which shoe provides a sliding surface for the boat to be carried by the trailer and a protector for the boat against being damaged by the trailer when the boat is being placed thereon or taken off of the trailer.

A further important object of the invention is to provide a shoe for conventional boat trailers which shoe is economical to produce, can be readily mounted on metal frame trailers being produced or already made and which shoe can provide a floatable support for a part of the trailer when in the water.

Further objects of the invention will be in part obvious and in part pointed out in the following detailed description of the accompanying drawing, in which;

FIG. 1 is a top perspective view of a trailer in accordance with the present invention, FIG. 2 is an enlarged cross-sectional view taken on line 2—2 of FIG. 1, FIG. 3 is an enlarged longitudinal sectional view taken on line 3—3 of FIG. 1, and FIG. 4 is a bottom perspective view of the present shoe.

Referring now more particularly to the accompanying drawing wherein like and corresponding parts are shown by similar reference characters, A generally designates a conventional boat trailer having parallel straight side frames B and C connected by cross members D, rollers E, axle F, wheels G rotatably mounted on said axle, stanchion H providing a bow stop and couplings I for attaching the trailer to a tow vehicle.

Shoe J is of one piece of material such as is employed in the boat to be carried by the trailer such as wood, a light metal such as aluminum, or a plastic such as fiberglass. However, shoe J may also be made of a buoyant material besides wood such as layers of a plastic with cork, plywood, or the like therebetween or expanded Royalite produced by the United States Rubber Company.

Said shoe J has a side 1 with a series of holes 2 therethrough and a second similar side 3 with a series of holes 4 therethrough. Sides 1 and 3 are each of a greater width than either frame B or C. Side 5 extends normal to and between said sides and is integral therewith and has a wide V-shaped top corner 10 formed with top 7. Top 7 has a half portion extending from the corner 9 it forms with side 3, downwardly to the middle of said top while the other half portion 11 extends upwardly from portion 8 to the corner 12 formed with side 1.

Shoe J is mounted on trailer A by placing side 1 along the outside of frame B, side 3 along the outside of frame C and side 5 along the outside of the rear cross-member D. Thereafter bolts 20 are inserted through openings 2 and corresponding openings in frame B and nuts 21 mounted on said bolts. Similarly bolts 22 are inserted through openings 4 and corresponding openings in frame C and nuts 23 fastened on bolts 22. Likewise bolt 24 is inserted opening 24a in side 5 and a corresponding opening in the rear cross-member D and a nut (not shown) fastened on bolt 24. Thus top 7 is positioned above the rear portion of trailer A and the rear portions of frames B and C as well as rear cross-piece D are covered by said shoe.

The trailer A with shoe J thereon is used in much the same manner as conventional boat trailers. That is the bow of the boat is placed on shoe top 7 and drawn thereacross onto rollers E and against stanchion H. However, shoe J being smooth and of a material similar to that of the boat permits the boat to be more readily slid thereover, requires less effort in guiding the boat as the boat keel will automatically slide to the center of top 7 due to the V-shape thereof and the boat will be protected from striking the metal frame of trailer A by said shoe. Also if shoe J is of a buoyant character it will assist in keeping the rear end of the trailer from sinking deeply in the water when placed therein permitting the floating of the boat on and off of said trailer, as well as preventing wheels G from sinking into a soft bottom below the water.

The present shoe can be of a different size or configuration than shown so that it may be used with different forms of trailers than trailer A which is shown only by way of an example.

Thus the present device is capable of considerable modification and such changes thereto as come within the scope of the appended claims is deemed a part of the invention.

I claim:

1. A mobile boat trailer comprising a wheeled frame having at least side frame members extending longitudinally of said trailer, a shoe having a top extending over said side frame members and a plurality of sides each extending alongside one of said side frame members and means fastening said shoe sides to an end portion, of the adjacent frame.

2. A mobile boat trailer comprising a wheeled metal frame having longitudinally extending side frames and cross-members joining said side frames, a shoe having a V-shaped top and sides extending downwardly from said top and means fastening said sides to an end portion of said side frames and at least one of said cross-members positioning said shoe above an end portion of said wheeled metal frame.

3. A shoe for mobile boat trailers having longitudinally and laterally extending frame members comprising a top capable of extending between and along a portion of the trailer longitudinal frame members, a plurality of sides extending from said top at an angle thereto and means for connecting said sides alongside of and to a portion of the trailer frame members.

4. A shoe for mobile boat trailers as claimed in claim 3 wherein said top and sides are of one-piece of sheet material.

5. A shoe for mobile boat trailers as claimed in claim 3 wherein said top and sides are of a buoyant character.

6. A shoe for mobile boat trailers as claimed in claim 3 wherein said top and sides are of one piece of sheet material, said top has a wide V-shaped configuration and said sides extend normal thereto.

7. A mobile boat trailer as claimed in claim 1 wherein said shoe top and sides are of one piece of material having a buoyant characteristic.

References Cited

UNITED STATES PATENTS

| 2,256,038 | 9/1941 | Woodruff | 280—414 X |
| 3,004,771 | 10/1961 | Moore | 280—414 X |
| 3,142,494 | 7/1964 | Kelley | 280—414 |
| 3,224,019 | 12/1965 | Gudmundson | 280—414 |
| 3,262,139 | 7/1966 | Campbell | 280—414 |

LEO FRIAGLIA, *Primary Examiner.*